(No Model.)
A. J. WISNER.
AIR BRAKE.
No. 335,049. Patented Jan. 26, 1886.
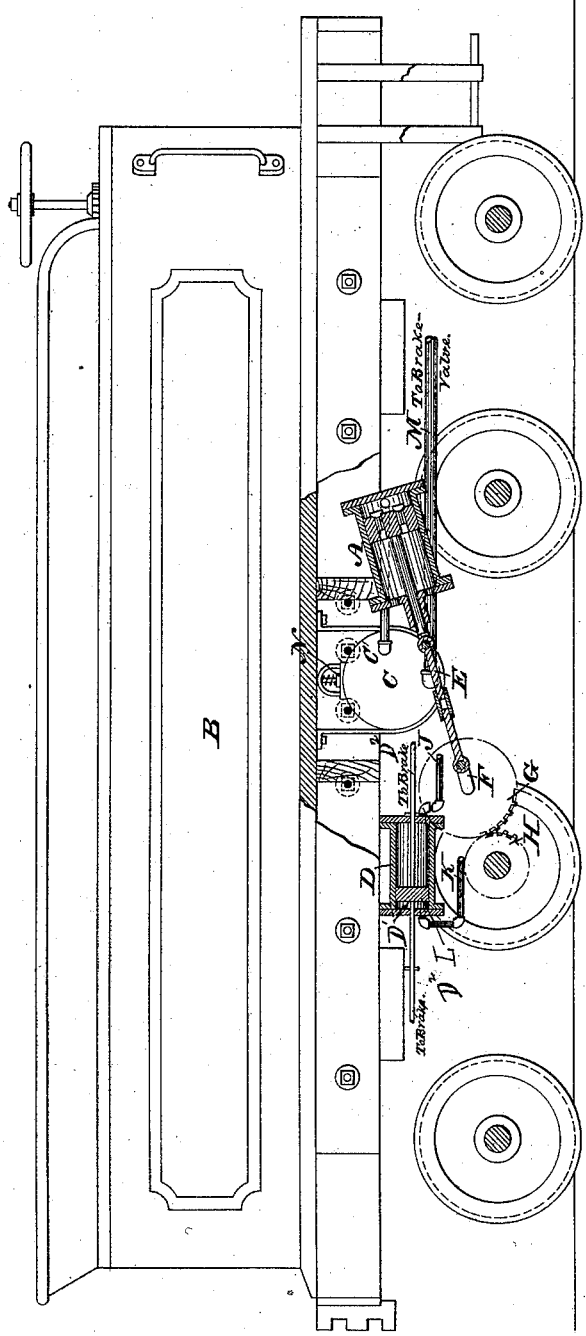
WITNESSES:
A. P. Grant,
W. F. Kirchen
INVENTOR:
Andrew J. Wisner.
BY
ATTORNEY.

UNITED STATES PATENT OFFICE.

ANDREW J. WISNER, OF PHILADELPHIA, PENNSYLVANIA, ASSIGNOR OF ONE-HALF TO MARCUS F. RICHARDSON, OF SAME PLACE.

AIR-BRAKE.

SPECIFICATION forming part of Letters Patent No. 335,049, dated January 26, 1886.

Application filed January 31, 1885. Serial No. 154,516. (No model.)

*To all whom it may concern:*

Be it known that I, ANDREW J. WISNER, a citizen of the United States, residing in the city and county of Philadelphia, State of Pennsylvania, have invented a new and useful Improvement in Air-Brakes, which improvement is fully set forth in the following specification and accompanying drawing, in which the figure is a longitudinal section of an air-brake embodying my invention.

The object of the present invention is, first, the operation of the pump or pumping mechanism of an air-brake without employing the steam of the engine, and, next, the employment of air both to put on and take off the brakes, the use of springs to take off the brakes being obviated.

Referring to the drawing, A represents an air-pump, which is of usual construction, and secured to the body of the tender of a locomotive-engine, and may be secured to the body of the engine or of a car, as desired, either body being designated as B. To said body B is also secured the air-receiving cylinder or drum C and the brake-cylinder D, said cylinder C being supplied with air by the pump A; or, if desired, the air-cylinder connected with the engine may be employed, the same being in communication with the cylinder C, the latter thus being the auxiliary air-receiving cylinder.

E represents the piston or plunger rod of the pump A, which is connected with a crank-shaft, F, whose bearings are on the body B, said shaft carrying a pinion or spur wheel, G, with which gears a spur-wheel or pinion, H, on one of the axles of the tender, engine, or car.

The brake-cylinder has connected with its opposite ends or heads the pipes J K, so as to admit air to opposite sides of the piston L of said cylinder, the piston-rod being connected with the brake mechanism.

On the engine is a three-way cock or valve, which is connected with a pipe, M, leading to the air-receiving cylinder C and the pipes J K of the brake-cylinder.

Each car may be provided with an air-receiving cylinder, an air-pump, and a brake-cylinder, and suitable connections with the pipes J K M, said pump being operated from the wheels of the car by the gearing described, or other suitable gearing, and the crank-shaft F, in lieu of which latter I may employ a wrist-pin on the wheel G.

It will be seen that when the engine, tender, or car is in motion, the pump A is operated and the cylinder C supplied with air.

When the brakes are to be applied, the engineer operates the brake-valve, whereby air is directed from the cylinder C by the pipe M into one of the pipes J K, and the piston of the brake-cylinder accordingly moved, the result of which is the operation of the brake mechanism. When the car or train is stopped, the brake-valve is again operated and air directed from the pipe M into the other pipe, J or K, thus moving the piston of the brake-cylinder in the opposite direction and operating the brake mechanism, whereby the brakes are promptly and positively released, it being seen that the latter operation is accomplished without the use of springs, air being employed for both putting on and taking off the brakes.

The piston D', within the brake-cylinder D, has secured to it two piston-rods, D², which project in opposite directions and pass through the end heads of said cylinder, whereby the brake mechanism for the two ends of a car are operated by the same piston, a single cylinder thus being employed for said mechanism.

The pump A is in communication with the air storage or receiving cylinder C by means of the pipe C'.

The air-receiving cylinder is provided with a safety-valve, N, whereby, as the pumping operation continues with the motion of the car or train, when the pressure in said cylinder exceeds the maximum the valve opens, and thus permits the escape of air until the proper pressure is restored, the valve then closing.

Having thus described my invention, what I claim as new, and desire to secure by Letters Patent, is—

1. The pump A, crank F, gearing G H, and axle of a car, in combination with the air-receiving cylinder C, the pipe C', the pipe M, and the brake-cylinder D, with pipes J K at its opposite ends, said pipes M J K being connected with the brake-valve, substantially as and for the purpose set forth.

2. In a car-brake, a pump, in combination with the air-receiving cylinder C, the pipe C', the pipe M, and the brake-cylinder D with pipes J K at its opposite ends, said pipes M J K being connected with the brake valve, substantially as and for the purpose set forth.

3. The pump A, and gearing connected with the axle of a car for operating the pump, an air-receiving cylinder, C, the pipe C', and the pipe M, in combination with the brake-cylinder D, having pipes J K at its opposite ends, and piston-rods $D^2$, projecting in opposite directions through the end heads of said cylinder D, substantially as and for the purpose set forth.

4. The pump A, and gearing connected with the axle of a car for operating the pump, an air-receiving cylinder, C, a relief-valve on said cylinder, the pipe C', and the pipe M, in combination with the brake-cylinder D, having pipes J K at its oposite ends, and piston-rods $D^2$, projecting in opposite directions through the end heads of said cylinder D, substantially as and for the purpose set forth.

ANDREW J. WISNER.

Witnesses:
JOHN A. WIEDERSHIEM,
A. P. GRANT.